(12) United States Patent
Kiraly

(10) Patent No.: US 8,065,711 B2
(45) Date of Patent: *Nov. 22, 2011

(54) CHAINCAST METHOD AND SYSTEM FOR BROADCASTING INFORMATION TO MULTIPLE SYSTEMS WITHIN THE INTERNET

(75) Inventor: Jozsef Kiraly, San Martin, CA (US)

(73) Assignee: ChainCast, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/606,622

(22) Filed: Oct. 27, 2009

(65) Prior Publication Data
US 2010/0050223 A1 Feb. 25, 2010

Related U.S. Application Data

(63) Continuation of application No. 09/253,117, filed on Feb. 19, 1999, now Pat. No. 7,610,607.

(51) Int. Cl.
*H04N 7/173* (2011.01)
*H04L 12/18* (2006.01)
*G06F 13/00* (2006.01)
*G06F 12/16* (2006.01)
*G06F 15/16* (2006.01)
*H04N 5/445* (2011.01)

(52) U.S. Cl. ............ 725/119; 725/90; 709/232; 370/390

(58) Field of Classification Search ................ 725/105, 725/90, 107, 108, 87–89, 118–119; 370/390; 709/231, 232, 224, 203
See application file for complete search history.

(56) References Cited

U.S. PATENT DOCUMENTS

| | | | |
|---|---|---|---|
| 3,651,471 | A | 3/1972 | Haselwood et al. |
| 5,235,599 | A | 8/1993 | Nishimura et al. |
| 5,377,327 | A | 12/1994 | Jain et al. |
| 5,377,329 | A | 12/1994 | Seitz |
| 5,455,569 | A | 10/1995 | Sherman et al. |
| 5,459,719 | A | 10/1995 | Hayashi |

(Continued)

FOREIGN PATENT DOCUMENTS

EP 0851364 7/1998

(Continued)

OTHER PUBLICATIONS

Press Release, "Progressive Networks Launches the First Commercial Audio-on-Demand System over the Internet," Apr. 10, 1995.

(Continued)

*Primary Examiner* — Pankaj Kumar
*Assistant Examiner* — Reuben Brown

(57) ABSTRACT

A method and system for performing chaincast communication to multiple communication systems within a system of coupled electronic devices. In one implementation the electronic devices can be computer systems and the system of coupled electronic devices includes the Internet. The present invention provides a system wherein a broadcast source communicates broadcast information (e.g., encoded audio radio content, encoded audio/video television content, program instructions, etc.) to a first group of electronic devices. The first group of electronic devices can be instructed by a transmission scheduler to then communicate (e.g., forward) the broadcast information to other electronic devices which devices can also be instructed to communicate to more devices, etc., thereby reducing the bandwidth requirements of the communication channel between the broadcast source and the first group of electronic devices.

11 Claims, 6 Drawing Sheets

U.S. PATENT DOCUMENTS

| | | | |
|---|---|---|---|
| 5,522,044 A | 5/1996 | Pascucci et al. |
| 5,550,978 A | 8/1996 | Takahashi |
| 5,559,933 A | 9/1996 | Boswell |
| 5,574,898 A | 11/1996 | Leblang et al. |
| 5,583,994 A | 12/1996 | Rangan |
| 5,590,118 A | 12/1996 | Nederlof |
| 5,634,011 A | 5/1997 | Auerbach et al. |
| 5,673,031 A | 9/1997 | Meier |
| 5,706,431 A | 1/1998 | Otto |
| 5,761,416 A | 6/1998 | Mandal et al. |
| 5,761,433 A | 6/1998 | Billings |
| 5,778,187 A | 7/1998 | Monteiro et al. |
| 5,781,551 A | 7/1998 | Born |
| 5,784,615 A | 7/1998 | Lipe et al. |
| 5,790,958 A | 8/1998 | McCoy et al. |
| 5,793,974 A | 8/1998 | Messinger |
| 5,793,980 A | 8/1998 | Glaser et al. |
| 5,805,825 A | 9/1998 | Danneels et al. |
| 5,818,906 A | 10/1998 | Grau et al. |
| 5,825,772 A | 10/1998 | Dobbins et al. |
| 5,850,396 A | 12/1998 | Gilbert |
| 5,852,714 A | 12/1998 | Tseng et al. |
| 5,854,892 A | 12/1998 | Liu et al. |
| 5,872,981 A | 2/1999 | Waddington et al. |
| 5,884,031 A | 3/1999 | Ice |
| 5,933,829 A | 8/1999 | Durst et al. |
| 5,948,070 A | 9/1999 | Fujita et al. |
| 5,949,411 A | 9/1999 | Doerr et al. |
| 5,987,525 A | 11/1999 | Roberts et al. |
| 5,990,881 A | 11/1999 | Inoue et al. |
| 6,002,836 A | 12/1999 | Inoue et al. |
| 6,006,257 A | 12/1999 | Slezak |
| 6,012,086 A | 1/2000 | Lowell |
| 6,014,669 A | 1/2000 | Slaughter et al. |
| 6,018,710 A | 1/2000 | Wynblatt et al. |
| 6,023,733 A | 2/2000 | Periasamy et al. |
| 6,075,543 A | 6/2000 | Akeley |
| 6,081,840 A | 6/2000 | Zhao |
| 6,084,510 A | 7/2000 | Lemelson et al. |
| 6,105,145 A | 8/2000 | Morgan et al. |
| 6,119,163 A | 9/2000 | Monteiro et al. |
| 6,122,259 A | 9/2000 | Ishida |
| 6,141,680 A | 10/2000 | Cucchiara |
| 6,147,695 A | 11/2000 | Bowen et al. |
| 6,157,377 A | 12/2000 | Shah-Nazaroff et al. |
| 6,175,861 B1 | 1/2001 | Williams et al. |
| 6,175,871 B1 | 1/2001 | Shuster et al. |
| 6,185,598 B1 | 2/2001 | Farber et al. |
| 6,189,039 B1 | 2/2001 | Harvey et al. |
| 6,195,680 B1 | 2/2001 | Goldszmidt et al. |
| 6,222,821 B1 | 4/2001 | Sees et al. |
| 6,246,672 B1 | 6/2001 | Lumelsky |
| 6,248,946 B1 | 6/2001 | Dwek |
| 6,256,704 B1 | 7/2001 | Hlava et al. |
| 6,275,937 B1 | 8/2001 | Hailpern et al. |
| 6,314,094 B1 | 11/2001 | Boys |
| 6,349,329 B1 | 2/2002 | Mackintosh et al. |
| 6,349,349 B1 | 2/2002 | Fujita et al. |
| 6,377,972 B1 | 4/2002 | Guo et al. |
| 6,393,468 B1 | 5/2002 | McGee |
| 6,400,407 B1 | 6/2002 | Zigmond et al. |
| 6,408,435 B1 | 6/2002 | Sato |
| 6,434,622 B1 | 8/2002 | Monteiro et al. |
| 6,449,653 B2 | 9/2002 | Klemets et al. |
| 6,463,075 B1 | 10/2002 | Hoebeke |
| 6,463,454 B1 | 10/2002 | Lumelsky et al. |
| 6,505,240 B1 * | 1/2003 | Blumenau ............... 709/218 |
| 6,529,960 B2 | 3/2003 | Chao et al. |
| 6,587,127 B1 | 7/2003 | Leeke et al. |
| 6,600,719 B1 | 7/2003 | Chaudhuri |
| 6,606,482 B1 | 8/2003 | Wheeler |
| 6,611,872 B1 | 8/2003 | McCanne |
| 6,622,171 B2 | 9/2003 | Gupta et al. |
| 6,628,625 B1 | 9/2003 | Birdwell et al. |
| 6,636,896 B1 | 10/2003 | Philyaw |
| 6,643,707 B1 | 11/2003 | Booth |
| 6,691,312 B1 | 2/2004 | Sen et al. |
| 6,747,692 B2 | 6/2004 | Patel et al. |
| 6,810,526 B1 | 10/2004 | Menard et al. |
| 2002/0184339 A1 | 12/2002 | MacKintosh et al. |
| 2003/0149988 A1 | 8/2003 | Ellis et al. |

FOREIGN PATENT DOCUMENTS

| | | |
|---|---|---|
| WO | WO9748051 | 12/1997 |
| WO | WO9903216 A1 | 1/1999 |
| WO | WO9938266 | 7/1999 |

OTHER PUBLICATIONS

Furht et al., "IP Simulcast: A New Technique for Multimedia Broadcasting over the Internet," Journal of Computing and Information Technology, Sep. 1998, pp. 245-254.

DeJesus, Edmund X., "How the Internet Will Replace Broadcasting", BYTE Magazine, US McGraw-Hill Inc., St. Peterborough, vol. 21, No. 2, Feb. 1, 1996, pp. 51-54, 56, 60, 62 and 64.

* cited by examiner

CHAINCAST METHOD AND SYSTEM FOR BROADCASTING INFORMATION TO MULTIPLE SYSTEMS WITHIN THE INTERNET

This patent application is a Continuation of U.S. patent application Ser. No. 09/253,117, filed on Feb. 19, 1999, now U.S. Pat. No. 7,610,607, which is hereby incorporated by reference in its entirety.

BACKGROUND OF THE INVENTION

1. Field of the Invention

The present invention relates to the field of digital information communication. More specifically, the present invention relates to the field of computer implemented digital broadcast communication of information over the Internet.

2. Related Art

The Internet is a large network made up of a number of smaller networks. It is made up of more than 100,000 interconnected networks in over 100 countries, comprised of commercial, academic and government networks. It has become commercialized into a worldwide information highway and data base, containing information on every subject known to humankind.

The proper and efficient use of the great amount of information available on various Internet sites has the potential of providing Internet users with a variety of information desired for businesses and individuals. In particular, those users interested in certain segments of the information available on the Internet or those users interested in certain specific Internet sites could benefit tremendously from having their specific information of interest available to them in an automated and interesting manner. Moreover, such users would benefit greatly from being constantly and automatically updated on new information as the new information becomes available on their sites of interest.

Due to the prevalence and popularity of the World Wide Web (also called the "Web") servers around the world, a great number of Internet users are particularly interested in receiving updated information of interest to them from various World Wide Web servers on the Internet. By way of background, the World Wide Web is an Internet facility that links documents locally and remotely. The Web document is called a Web page, and links in the page let users jump from page to page (hypertext) whether the pages are stored on the same server or on servers around the world. The pages are accessed and read via a Web browser such as Netscape Navigator or Microsoft Internet Explorer.

The Web has become the center of Internet activity since, among other reasons, Web pages, containing both text and graphics, are easily accessible via a Web browser. The Web contains the largest collection of online information in the world, and the amount of information is increasing. Current schemes for accessing a Web document require typing in the URL (Uniform Resource Locator) address of the home page in the Web browser. From there, the user starts surfing through the Internet via hypertext links to other documents that can be stored on the same server or on a server anywhere in the world.

The shear size of the information available on the Internet and the Web has made it a necessity for individuals and businesses to efficiently and constantly sift through the available information in order to find and organize the information that is of interest. Stated differently, individuals and businesses realize that the availability of information itself does not result in a competitive edge unless the information is reduced to a manageable size and unless the information so reduced in size is of interest and of value to the business or the individual.

FIG. 1 illustrates a system 70 regarding one use of the Internet. In system 70, the Internet 40 is used to provide a communication channel between a broadcast source 60 and a number of receiving devices 10, 12, 14. A digital broadcast signal, e.g., representing some audio/video content or program such as a radio program or television program, can be broadcast in encoded digital packets from the source server 60 to the receivers 10, 12, 14. Although the broadcast content is the same for each receiver, a separate communication stream, comprising separate digital data packets, is required for each receiver that is coupled to the Internet. Therefore, three separate communication streams 20, 21 and 22 are shown as being broadcast from server 60 onto the Internet 40. Stream 20 is identified and communicated for receiver 10, stream 21 is identified and communicated for receiver 12 and stream 22 is identified and communicated for receiver 14.

As a result of the above, it is clear that the number of users (receivers) that can receive broadcasted information on the Internet simultaneously from one server 60 is limited mainly by the connection speed between the server 60 and the Internet 40 because each stream 20, 21, 22 consumes available bandwidth. For example, assuming it is desired to broadcast a radio program over the Internet to users, e.g., that visit the web site of the server 60 (FIG. 1). Depending on the compression algorithm used, and on the number of users that want to listen to the program simultaneously, the server 60 needs to be connected to the Internet 40 with a speed of at least N×K bytes/s, where K is the bandwidth requirement for one user and N is the number of users able to listen to the program simultaneously. Assuming the server connection to the Internet allows up to 100 Mbit/s bandwidth, the number of listeners will be limited to roughly 20,000 per server, assuming roughly 5 Kbits/s bandwidth requirement per user.

Accordingly, what is needed is a method and system that is able to provide broadcast communication content to many users, pseudo simultaneously, without being limited to the bandwidth constraints of the server to Internet connection. The present invention provides such a solution.

SUMMARY

What is described is a method to broadcast information over the Internet to many users pseudo simultaneously solving the problem arising from the connection speed limitations between a server and the Internet.

A method and system are described herein for performing chaincast communication to multiple communication systems within a system of coupled electronic devices. In one implementation the electronic devices can be computer systems and the system of coupled electronic devices includes the Internet. The present invention provides a system wherein a broadcast source communicates broadcast information (e.g., encoded audio radio content, encoded audio/video television content, program instructions, etc.) to a first group of electronic devices. The first group of electronic devices can be instructed by a transmission scheduler to then communicate (e.g., forward) the broadcast information to other electronic devices, which devices can also be instructed to communicate to more devices, etc., thereby reducing the bandwidth requirements of the communication channel between the broadcast source and the first group of electronic devices. Typically, the communication channel between the broadcast source and the first group involves the connection between the Internet and the server.

Slight communication delays may be encountered by the transmission forwarding, but these delays can typically be tolerated in broadcast transmissions (e.g., radio content, television content, seminars, etc.) because they are not generally interactive. The transmission scheduler, coupled to the Internet, is used to track and manage which devices are forwarding broadcast information to which other devices. The transmission scheduler is able to re-route communications when one or more devices terminates or to provide better communication load sharing across the system. The communication is "chaincast" because the forwarding from one device to another, to another, etc., creates a logical communication "chain" from the broadcast server to and through the receiving devices.

An embodiment of the present invention includes a method of communicating broadcast information comprising the steps of: a) causing a server to communicate a first stream representing digital broadcast information to a first user device wherein the server and the first user device are coupled to the Internet; b) causing the server to communicate a second stream representing the broadcast information to a second user device wherein the second user device is coupled to the Internet; c) causing the first user device to communicate a third stream representing the broadcast information to a third user device wherein the third user device is coupled to the Internet; and d) rendering, pseudo simultaneously, the broadcast information on the first, second and third user devices.

DETAILED DESCRIPTION

Figure 1:
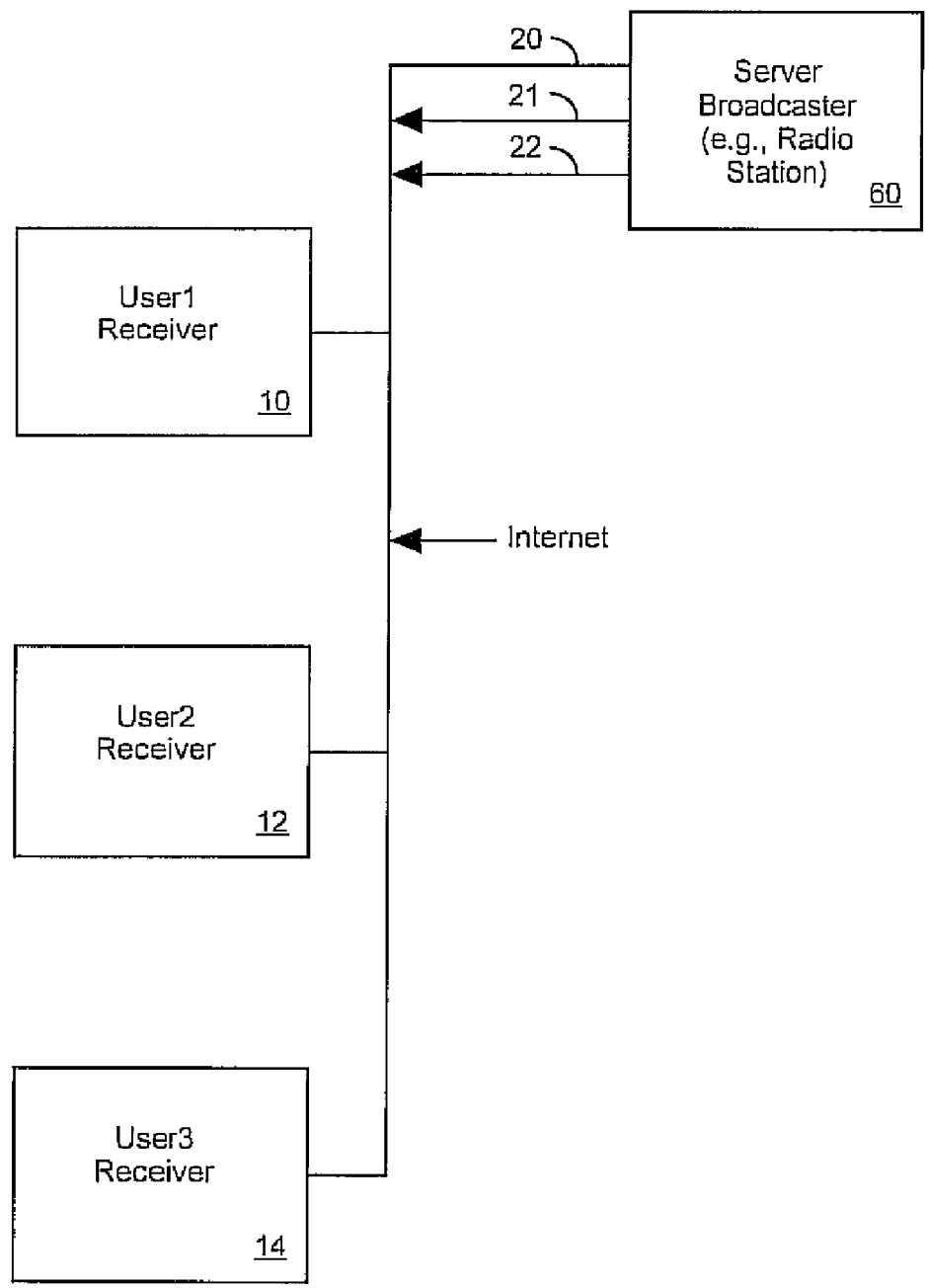
FIG. 1 illustrates a prior art information broadcast system using the Internet.

In the following detailed description of the present invention, a system and method for communicating digital broadcast content to multiple users, pseudo simultaneously, without being constrained to the bandwidth of the server-to-Internet connection, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computer System 112

Aspects of the present invention, described below, are discussed in terms of steps executed on a computer system. Aspects of the present invention are also discussed with respect to an Internet system including electronic devices and servers coupled together within the Internet platform. A "server" and an "electronic device" or "user" can be implemented as a general purpose computer system. Although a variety of different computer systems can be used with the present invention, an exemplary computer system 112 is shown in FIG. 2.

In general, computer system 112 that can be used by the present invention comprises an address/data bus 100 for communicating information, a central processor 101 coupled with the bus for processing information and instructions, a volatile memory 102 (e.g., random access memory) coupled with the bus 100 for storing information and instructions for the central processor 101 and a non-volatile memory 103 (e.g., read only memory) coupled with the bus 100 for storing static information and instructions for the processor 101. Computer system 112 also includes a data storage device 104 ("disk subsystem") such as a magnetic or optical disk and disk drive coupled with the bus 100 for storing information and instructions and a display device 105 coupled to the bus 100 for displaying information to the computer user.

Also included in computer system 112 is an alphanumeric input device 106 including alphanumeric and function keys coupled to the bus 100 for communicating information and command selections to the central processor 101. Generally, alphanumeric input device 106 is called a keyboard or keypad. System 112 also includes a cursor control or directing device 107 coupled to the bus for communicating user input information and command selections to the central processor 101. The cursor directing device 107 is typically displaced through user movement which causes a cursor image displayed on screen 105 to move accordingly. Within the context of the present invention, the cursor directing device 107 can include a number of implementations including a mouse device, for example, a trackball device, a joystick, a finger pad (track pad), an electronic stylus, an optical beam directing device with optical receiver pad, an optical tracking device able to track the movement of a user's finger, etc., or any other device having a primary purpose of moving a displayed cursor across a display screen based on user displacements.

Figure 2:
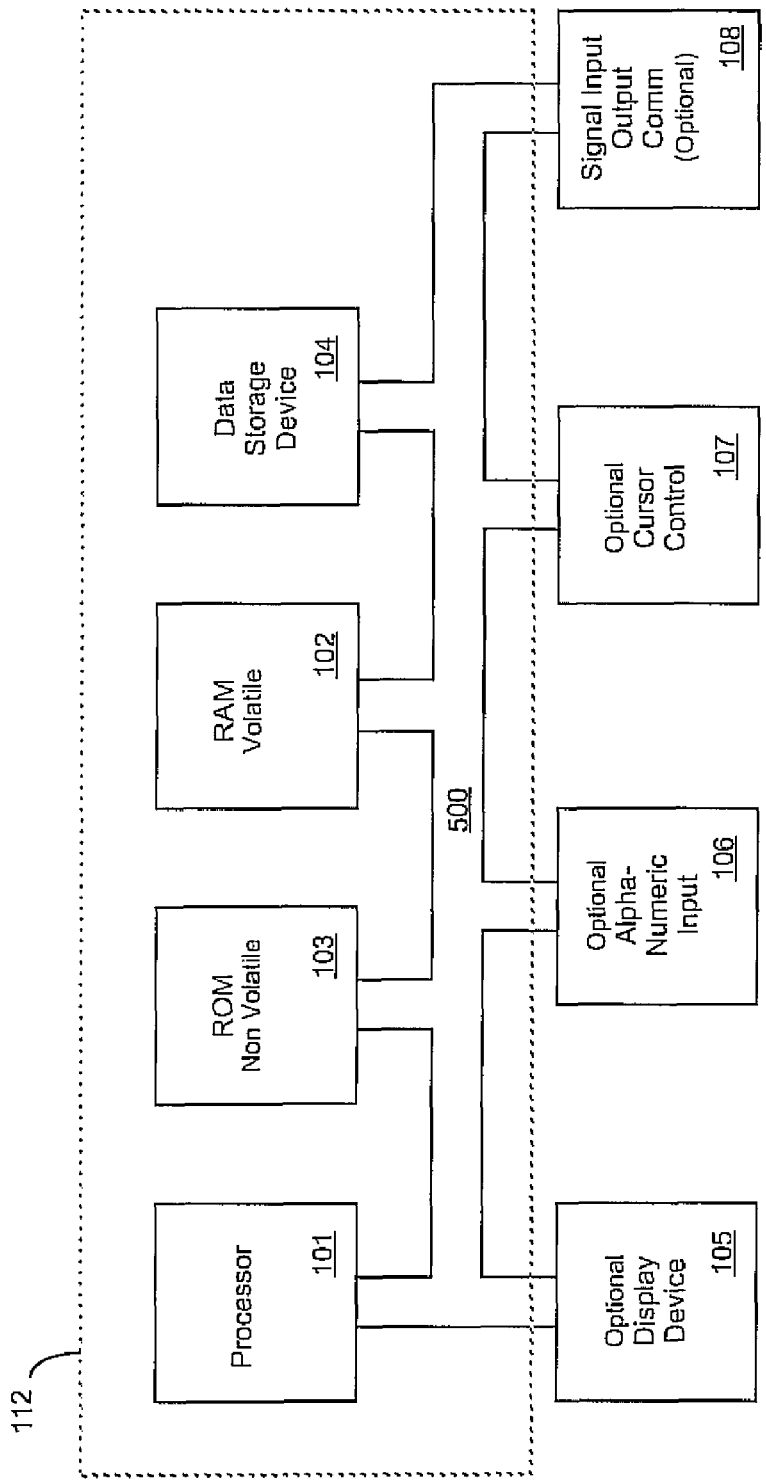
FIG. 2 illustrates a general purpose computer system which can be used as an electronic device, a user, or a server in accordance with the present invention.

Computer system 112 of FIG. 2 can also include an optional signal generating device 108 coupled to the bus 100 for interfacing with other networked computer systems, e.g., over the Internet. The display device 105 of FIG. 2 utilized with the computer system 112 of the present invention may be a liquid crystal device, other flat panel display, cathode ray tube, or other display device suitable for creating graphic images and alphanumeric characters recognizable to the user. In one embodiment of the present invention, computer system 112 is a Windows Operating System based computer system having an x86 architecture processor 101.

Chaincast Communication

Figure 3A:
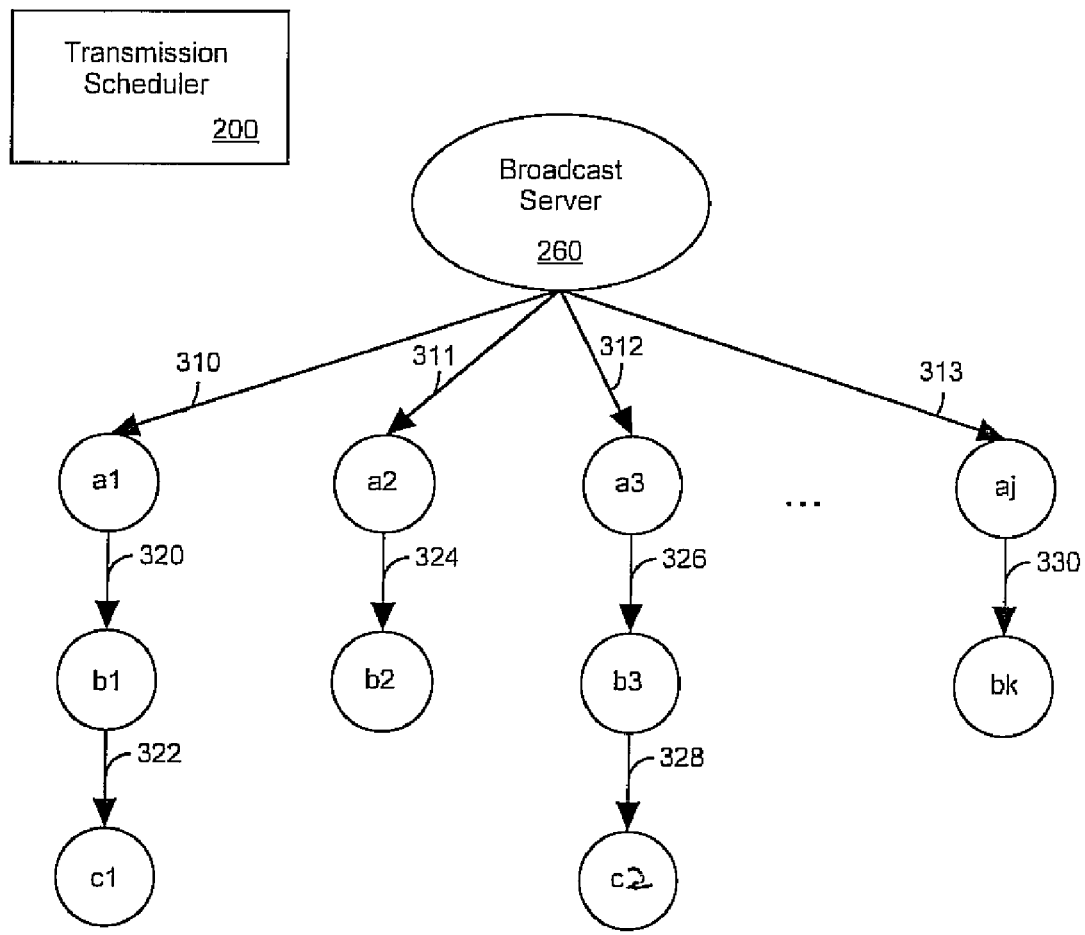
FIG. 3A is an exemplary communication diagram of the chaincast communication method of the present invention.

FIG. 3A illustrates an exemplary configuration in accordance with the present invention for performing "chaincast" communication within the Internet system. Within FIG. 3A, a broadcast server 260 supplies a broadcast content that a number of electronic devices a1-aj, b1-bk, c1 and c2 desire to receive "pseudo" simultaneously. This broadcast content ("program") can be of any nature or character that would be desired to be received by a number of users simultaneously, e.g., an encoded audio program (e.g., a radio program), an encoded audio/visual program (e.g., a television program), an instructional seminar, a software program, etc. The broadcast content is typically encoded into individual data packets and broadcast digitally.

Chaincasting of the present invention does not require a high speed connection between the broadcast server 260 and the Internet 300 (FIG. 4) and still allows practically an unlimited number of users to receive and render the broadcasted program. The chaincasting method can be applied to any kind of information broadcasting, including radio and television (TV). For simplicity, a radio broadcast is described as an example.

The present invention, instead of transmitting the information to many users from a server, causes the server to transmit the information only to a few users (e.g., a1-aj of FIG. 3A) and then instructs these few users to forward the information to the other users (e.g., b1-bk, c1 and c2) as needed. This is chaincasting. The present invention changes the paradigm of information providers and information consumers because all users can relay information to others thereby reducing the communication burden on the server-to-Internet connection. Instead of the old paradigm, the present invention creates an information sharing community (FIG. 3A) that utilizes the Internet resources optimally.

In the example of FIG. 3A, users a1-aj receive the broadcast content directly from the server via separate information streams 310-313, which are supported on the bandwidth resources of the connection between the Internet 300 (FIG. 4) and server 260. These streams each contain digital encoded packets that make up the digital broadcast content. The number of users, j, is set based on the bandwidth supported by the connection between the Internet 300 (FIG. 4) and server 260. Users a1-aj are instructed, by the transmission scheduler 200, to forward the broadcast content to users b1-bk in the fashion shown in FIG. 3A. A separate stream 320 is used between users a1 and b1; a separate stream 324 is used between users a2 and b2; a separate stream 326 is used between users a3 and b3; and a separate stream 330 is used between users aj and bk. Users b1 and b3 are instructed, by the transmission scheduler 200, to forward the broadcast content to users c1 and c2 in the fashion shown in FIG. 3A. A separate stream 322 is used between users b1 and c1 and a separate stream 328 is used between users b3 and c2.

Communication "chains" are formed, e.g., chain1 is a1-b1-c1; chain2 is a2-b2; chain3 is a3-b3-c2 and chain4 is aj-bk. Software loaded within each user can be used to provide the forwarding functionality.

Each user of FIG. 3A, registers with the transmission scheduler 200 which maintains and tracks the communication links established between the users. The transmission scheduler 200 load balances between the users so that the communication load is balanced to reduce latencies. Load balancing can be performed to maintain uniform chain sizes. For example, if one user is supplying a relatively larger number of other users (e.g., a chain size of four), then some of the receiver users can be moved from this chain such that they receive the information from other chains. It is possible for one user to receive broadcast information from more than one other user; the duplicate data can be ignored.

Figure 3B:
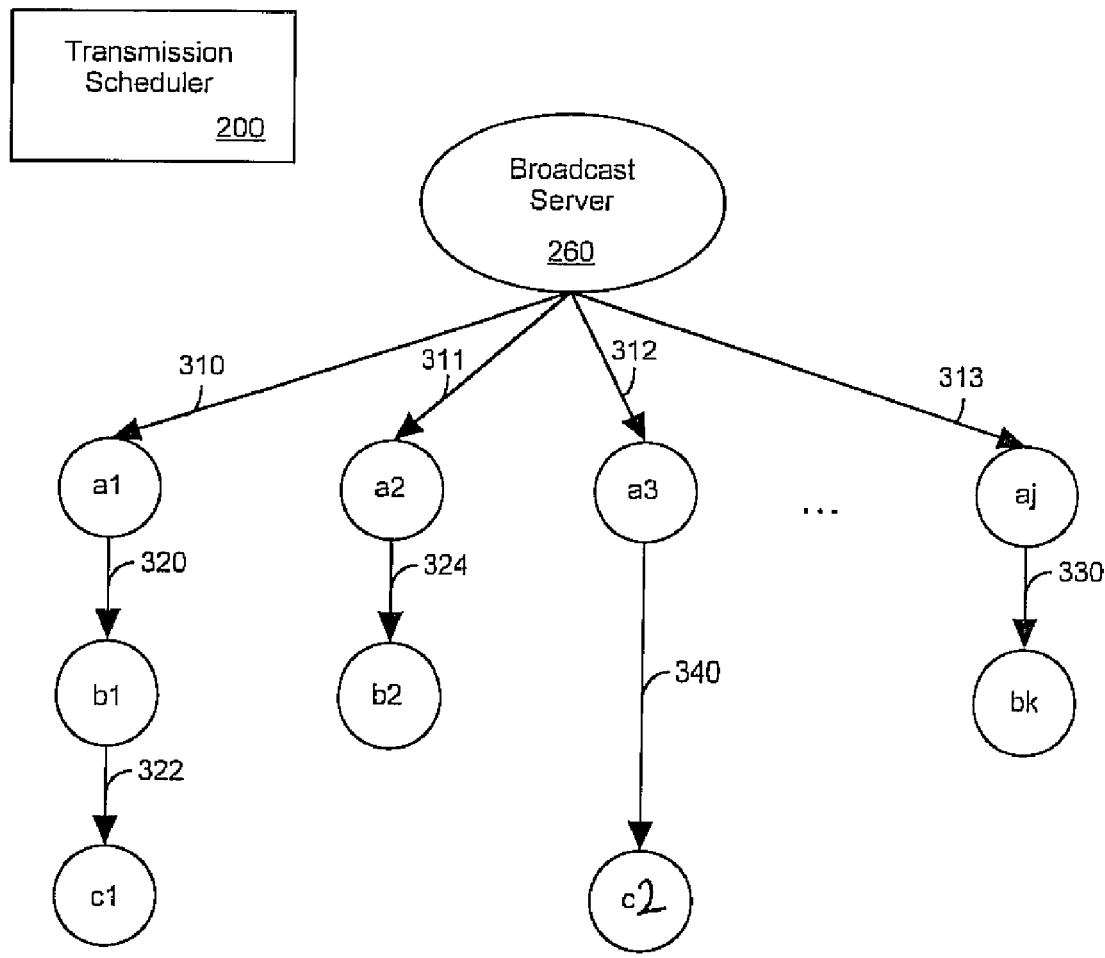
FIG. 3B is another exemplary communication diagram of the chaincast communication method of the present invention.

All users send status update messages to the transmission scheduler 200. Transmission scheduler 200 can use these status update messages to re-route communication links when one user becomes too slow, or shuts down. For instance, assume user b3 of FIG. 3A shuts down. The result is shown in FIG. 3B where the transmission scheduler 200 created a new link 340 to directly connect user a3 to user c2. The transmission scheduler 200 creates and maintains the new link 340 (as well as all other links). Assuming rendering pipelines are large enough with each user, the transfer between communication sources from FIG. 3A to FIG. 3B (with respect to user c2) can be performed transparently to user c2.

Figure 4:
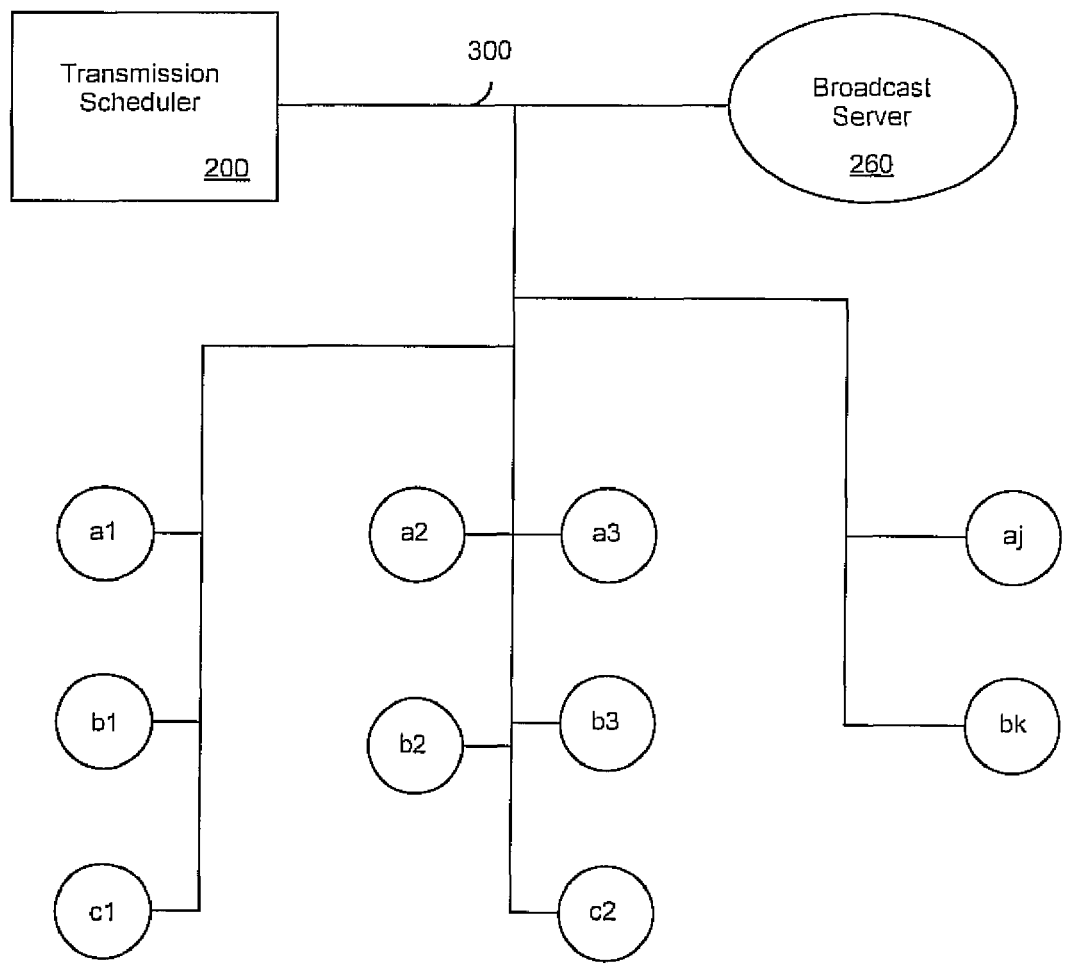
FIG. 4 is an Internet connection diagram of the devices of FIG. 3A.

FIG. 4 is a high level diagram of the Internet connection system of the devices of FIG. 3A. The users, a1-aj, b1-bk, c1 and c2 are coupled to the Internet 300. The broadcast server 260 and the transmission scheduler 200 are coupled to the Internet. Server 260 and scheduler 200 can reside in separate computer systems or can reside within the same computer system.

Figure 5:
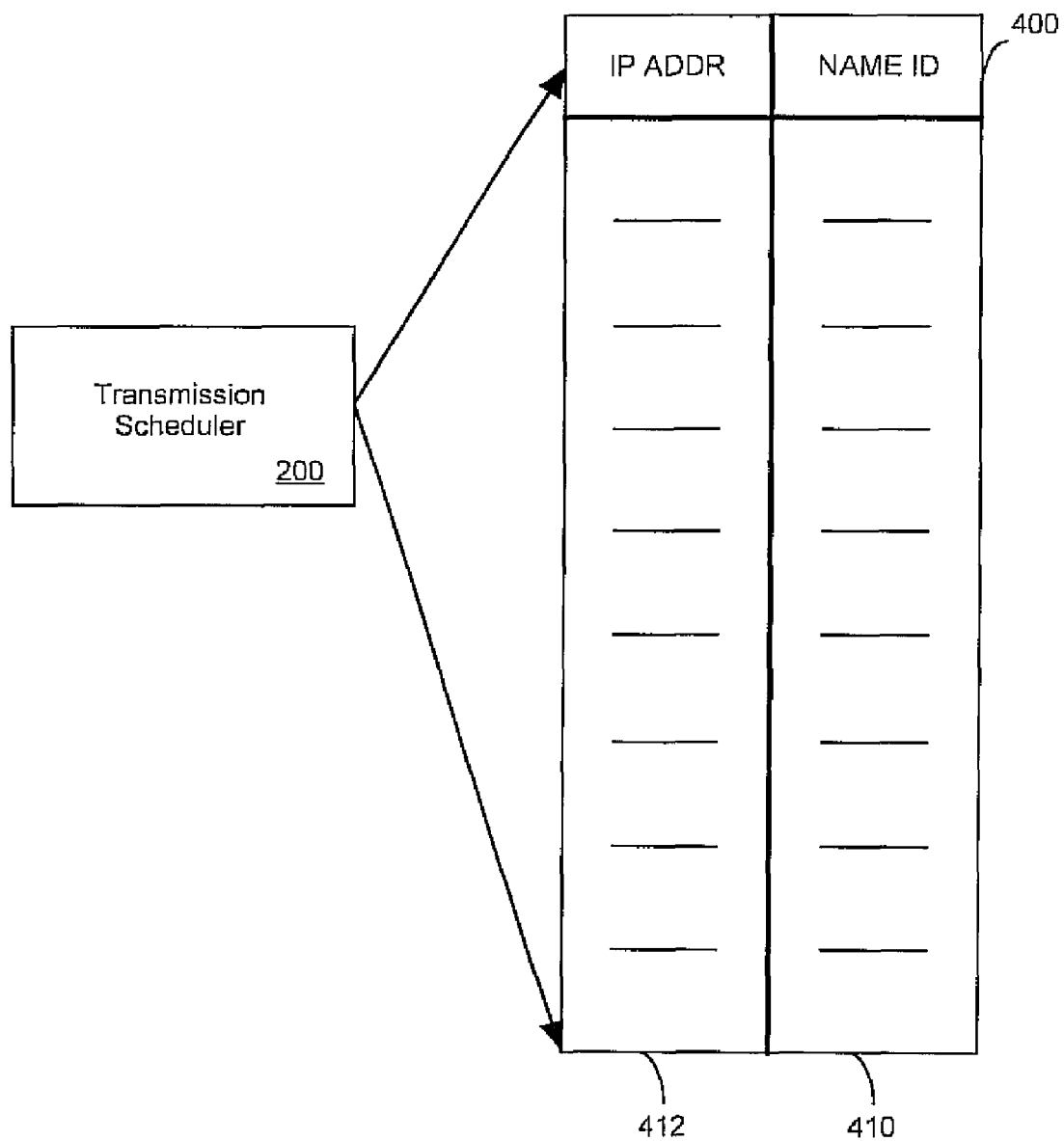
FIG. 5 illustrates a name table managed by the transmission scheduler of the present invention.

FIG. 5 illustrates that the transmission scheduler 200 can be coupled with a name server 400 that contains a listing of IP addresses 412 for each user and each user has an associated unique name (column 410). This name server is used to establish communication links between users. If a first user wants to talk to a second user, the first user informs transmission scheduler 200 of the communication link between itself and name of the second user. The transmission scheduler 200 then opens a direct link between the first and second users, over the Internet 300. The links shown in FIG. 3A and FIG. 3B can be opened using the name server in this fashion, but the establishment of these links and the designation of users are controlled by the transmission scheduler 200.

An example is given. On the broadcast server 260 is placed software that is operating with the following main functions: 1) multi-channel information transmitter; 2) name server; and 3) the transmission scheduler 200. On the user side, each user device has an Internet radio software program ("Internet radio") operating that allows broadcast digital packets to be decoded to thereby render an audible radio program originated by the multi-channel information transmitter.

When a user (new user) wants to listen to an Internet radio program, he or she will turn on the Internet radio software (on the computer). The Internet radio software will connect to the name server informing the name server about the IP address of the new user's Internet radio software. The Internet radio software will receive from the name server the list of available radio stations. The new user then selects the radio station and the Internet radio software will send this information to the transmission scheduler 200.

The transmission scheduler 200 then instructs the information transmitter of the server 260 to start transmitting the information to this IP address (the IP address of the new user) too, or it will instruct one of the radio software of a user that is already listening to the same program to forward the information to this new user. Therefore, the new user will receive the data either directly from the server, over the Internet, or from another user that is already receiving the information. The new user can then later be asked to provide, e.g., forward broadcast information to another user.

During the act of receiving information, the users' radio software will periodically inform the server 260 that they are still listening and the speed at which they are receiving information. When the user turns off his/her radio, the scheduler 200 and name server will be informed, and if they were forwarding information to other users, the forwarding will be rescheduled to other users or to the server 260.

Although any communication protocol can be used for the communication links of FIG. 3A and FIG. 3B, communication channels can be established using the Prody Phone Internet Telephony functionality as provided by Mindmaker, Inc. of San Jose, Calif. in the Intelligent Assistant software products. Also, radio stations all over the world can make their products available over the Internet 300 for millions of listeners using the Internet radio software.

Although the example of a radio program is used, the broadcast content can also be a television program or other audio/visual information or a software program, etc.

The preferred embodiment of the present invention, a system and method for communicating digital broadcast content to multiple users, pseudo simultaneously, without being constrained to the bandwidth of the server-to-Internet connection, is described. While the present invention has been described in particular embodiments, it should be appreciated that the present invention should not be construed as limited by such embodiments, but rather construed according to the below claims.

What is claimed is:

1. A method of communicating broadcast information, said method comprising:
   receiving at a first user device a list comprising a plurality of different content selections;
   sending from said first user device a content selection whose delivery is requested at a present time to a transmission scheduler;
   after said content selection is sent from said first user device and in response to instructions from said transmission scheduler, creating a first communication link between said first user device and a second user device that is receiving and rendering to a second user broadcast information representing said content selection, wherein said first user device is downstream from said second user device;
   receiving at said first user device said broadcast information from said second user device via said first communication link to render to a first user;
   receiving at a third user device said list comprising said plurality of different content selections;
   sending from said third user device a second content selection whose delivery is requested at a present time to said transmission scheduler;
   while receiving said broadcast information at said first user device and in response to instructions from said transmission scheduler, creating a second communication link between said third user device and said first user device which is receiving said broadcast information representing said second content selection, wherein said third user device is downstream from said first user device;
   retransmitting from said first user device said broadcast information to said third user device to render to a third user via said second communication link;
   transmitting said broadcast information to said second user device from a server;
   in response to said second user device shutting down and in response to instructions from said transmission scheduler, creating a third communication link between said first user device and said server; and
   receiving at said first user device said broadcast information from said server via said third communication link.

2. The method of claim 1, wherein said broadcast information is a radio program.

3. The method of claim 1, wherein said broadcast information is a television program.

4. The method of claim 1, wherein said broadcast information is a computer program.

5. The method of claim 1 further comprising:
   sending status update messages to said transmission scheduler.

6. A method of broadcasting information over a network of electronic devices, said method comprising:
   receiving at a first electronic device a list comprising a plurality of different content selections;
   sending from said first electronic device a content selection whose delivery is requested at a present time to a transmission scheduler;
   after said content selection is sent from said first electronic device and in response to instructions from said transmission scheduler, creating a first communication link between said first electronic device and a second electronic device of a group of electronic devices that are receiving and rendering broadcast information representing said content selection, wherein said first electronic device is downstream from said second electronic device;
   receiving at said first electronic device said broadcast information to render from said second electronic device via said first communication link;
   receiving at a third electronic device said list comprising said plurality of different content selections;
   sending from said third electronic device a second content selection whose delivery is requested at a present time to said transmission scheduler;
   while receiving said broadcast information at said first electronic device and in response to instructions from said transmission scheduler, creating a second communication link between said third electronic device and said first electronic device which is receiving said broadcast information representing said second content selection, wherein said third electronic device is downstream from said first electronic device;
   retransmitting from said first electronic device said broadcast information to said third electronic device to render via said second communication link;
   in response to said second electronic device shutting down and in response to instructions from said transmission scheduler, creating a third communication link between said first electronic device and a fourth electronic device of said group, wherein said first electronic device is downstream from said fourth electronic device; and receiving at said first electronic device said broadcast information from said fourth electronic device via said third communication link.

7. The method of claim 6 further comprising periodically sending status update messages from said electronic devices to said transmission scheduler.

8. The method of claim 6, wherein said broadcast information is a radio program.

9. The method of claim 6, wherein said broadcast information is a television program.

10. The method of claim 6, wherein said broadcast information is a computer program.

11. The method of claim 6, wherein said network of electronic devices comprises the Internet.

\* \* \* \* \*